(12) United States Patent
Pennec et al.

(10) Patent No.: US 10,007,013 B2
(45) Date of Patent: Jun. 26, 2018

(54) ELECTRONIC UNIT FOR A STREAMER

(71) Applicant: SERCEL, Carquefou (FR)

(72) Inventors: Daniel Pennec, Carquefou (FR); Frederic Nicolas, Carquefou (FR)

(73) Assignee: SERCEL, Carquefou (FR)

( * ) Notice: Subject to any disclaimer, the term of this patent is extended or adjusted under 35 U.S.C. 154(b) by 344 days.

(21) Appl. No.: 15/000,159

(22) Filed: Jan. 19, 2016

(65) Prior Publication Data

US 2016/0216388 A1 Jul. 28, 2016

(30) Foreign Application Priority Data

Jan. 27, 2015 (EP) ..................................... 15305087

(51) Int. Cl.
*G01V 13/00* (2006.01)
*G01V 1/20* (2006.01)

(52) U.S. Cl.
CPC .............. *G01V 1/201* (2013.01); *G01V 13/00* (2013.01)

(58) Field of Classification Search
USPC .......................................................... 367/154
See application file for complete search history.

(56) References Cited

U.S. PATENT DOCUMENTS

| | | | | |
|---|---|---|---|---|
| 3,921,755 A * | 11/1975 | Thigpen | ................... | G01V 1/16 181/112 |
| 4,396,088 A * | 8/1983 | Bayhi | ..................... | G01V 1/135 181/106 |
| 4,526,430 A * | 7/1985 | Williams | ............. | H01R 13/523 439/152 |
| 4,928,263 A * | 5/1990 | Armstrong | ............. | G01S 3/801 310/329 |
| 4,984,218 A * | 1/1991 | Ritter | ..................... | G01V 1/201 114/244 |
| 5,379,267 A * | 1/1995 | Sparks | .................... | B63B 22/18 367/18 |
| 5,400,298 A * | 3/1995 | Hepp | ..................... | G01V 1/201 174/101.5 |
| 5,600,608 A | 2/1997 | Weiss et al. | | |
| 5,796,676 A * | 8/1998 | Chang | .................... | G01V 1/186 367/154 |
| 5,883,857 A * | 3/1999 | Pearce | ................... | G01V 1/201 310/337 |
| 5,943,293 A * | 8/1999 | Luscombe | ............. | G01V 1/201 174/101.5 |

(Continued)

OTHER PUBLICATIONS

Search Report dated Jul. 13, 2015.

*Primary Examiner* — James R Hulka
(74) *Attorney, Agent, or Firm* — IPSilon USA, LLP

(57) ABSTRACT

An electronic unit is constructed having a casing, at least partially flexible, at least partially made of a polymer material. The casing extends along a longitudinal axis (X) between two lateral ends and has a hollow cylindrical core for housing a portion of a core cable of a streamer, and a plurality of walls outwardly extending from the hollow cylindrical core, delimiting spaces configured for housing electronics, and having free ends. One of the walls and the hollow cylindrical core of the casing have a through-slot that extends longitudinally over a total length of the casing from one lateral end to another lateral end. An electronic board has at least one flexible part and configured for at least partially resting on free ends of at least two of the plurality of walls.

16 Claims, 4 Drawing Sheets

(56) References Cited

U.S. PATENT DOCUMENTS

| | | | |
|---|---|---|---|
| 6,034,923 A * | 3/2000 | Wooters | G01V 1/201 181/110 |
| 6,108,267 A * | 8/2000 | Pearce | G01V 1/201 174/101.5 |
| 6,108,274 A | 8/2000 | Pearce | |
| 6,483,775 B1 | 11/2002 | Spackman et al. | |
| 6,853,604 B2 | 2/2005 | Spackman et al. | |
| 6,888,972 B2 * | 5/2005 | Berg | G01V 11/00 385/12 |
| 7,120,087 B2 | 10/2006 | Lee et al. | |
| 7,180,828 B1 * | 2/2007 | Sommer | G01V 1/201 367/153 |
| 7,468,932 B2 * | 12/2008 | Tenghamn | G01V 1/201 367/17 |
| 8,695,431 B2 * | 4/2014 | Pearce | B06B 1/0688 73/715 |
| 9,207,341 B2 * | 12/2015 | Pearce | B06B 1/0688 |
| 9,256,001 B2 * | 2/2016 | Pearce | B06B 1/0688 |
| 9,395,458 B2 * | 7/2016 | Bittleston | G01V 1/3826 |
| 9,791,579 B2 * | 10/2017 | Maples | G01V 1/184 |
| 2002/0175020 A1 * | 11/2002 | Corrigan | G01V 1/16 181/111 |
| 2002/0181327 A1 * | 12/2002 | Spackman | G01V 1/201 367/19 |
| 2003/0198133 A1 * | 10/2003 | Spackman | G01V 1/16 367/149 |
| 2004/0067002 A1 * | 4/2004 | Berg | G01V 11/00 385/12 |
| 2005/0146984 A1 * | 7/2005 | Lee | G01V 1/201 367/20 |
| 2005/0209783 A1 * | 9/2005 | Bittleston | G01V 1/3808 702/14 |
| 2008/0291779 A1 * | 11/2008 | Muyzert | G01V 1/3808 367/20 |
| 2012/0160030 A1 * | 6/2012 | Pearce | B06B 1/0688 73/753 |
| 2012/0161580 A1 * | 6/2012 | Pearce | B06B 1/0688 310/337 |
| 2012/0163119 A1 * | 6/2012 | Pearce | B06B 1/0688 367/20 |
| 2012/0163120 A1 * | 6/2012 | Pearce | G01V 1/186 367/21 |
| 2012/0242341 A1 * | 9/2012 | Olsson | G01V 3/15 324/326 |
| 2012/0269033 A1 * | 10/2012 | Maples | G01V 1/184 367/20 |
| 2013/0064038 A1 * | 3/2013 | Maples | G01V 1/184 367/20 |
| 2013/0208571 A1 * | 8/2013 | Pearce | G01V 1/201 367/154 |
| 2014/0362660 A1 * | 12/2014 | Pearce | B06B 1/0688 367/15 |
| 2016/0154126 A1 * | 6/2016 | Pearce | B06B 1/0688 367/149 |

* cited by examiner

ELECTRONIC UNIT FOR A STREAMER

RELATED APPLICATIONS

This application claims the benefit of priority from European Patent Application No. 15 305 087.7, filed on Jan. 27, 2015, the entirety of which is incorporated by reference.

FIELD OF THE INVENTION

The field of the invention is the marine geophysical survey equipment due to acquire seismic data information coming back from the seabed and its subsurface formations layers after a source signal has been triggered from the surface.

The invention particularly concerns an electronic unit, also called node, for processing seismic data issued from seismic sensors. Such an electronic unit is configured to be included in an active section of a streamer, sensing the seismic signals.

The invention may be applied in particular to the oil prospecting industry using seismic method (sea oil survey), but may be of interest for any other field, which requires a system performing geophysics data acquisition in a marine environment.

TECHNOLOGICAL BACKGROUND

As shown in FIG. 1, a network of seismic streamers 10, referenced 10a to 10e, is towed by a seismic vessel 11. A seismic streamer 10 generally includes a seismic telemetry cable, extending along the seismic streamer 10 and adapted to transmit seismic data towards the vessel.

A seismic streamer 10 generally includes different kinds of seismic devices, i.e. devices involved in the management of the seismic data, and especially:
  seismic sensors 30, such as hydrophones or geophones or accelerometers or the like, arranged along the streamer 10 and adapted for detecting acoustic signals;
  electronic units, also called nodes 20, distributed in series along the streamer 10 at intervals that are not necessarily regular, each node 20 being associated with a given set of seismic sensors 30, the nodes 20 particularly processing seismic data issued from seismic sensors 30;
  telemetry modules 40, also called concentrators, arranged along the seismic cable of the streamer 10, each associated with a given set of nodes 20 in particular for providing power supply and retrieving seismic data acquired by the nodes.

The seismic telemetry cable may also be adapted to transmit seismic quality control data, also called "QC data", towards or from the seismic vessel 11. These data relate to the quality control of the aforementioned seismic devices during their functioning, such as battery level, sensor status, memory status, synchronization availability, etc. For the sake of simplification, we shall refer in the following description to seismic data. It should be noted that seismic quality control data are applicable as well in this description.

The seismic streamer 10 also includes auxiliary equipment, i.e. "non-seismic devices" or "devices not involved in the management of the seismic data". Such auxiliary equipment may be:
  a head buoy 12 which typically supports the head end of the streamer 10 connected to the vessel 11;
  a tail buoy 13 which typically supports the tail end of the streamer 10;
  navigation control devices, commonly referred to as positioning birds 14, which are installed at intervals that are not necessarily regular, for example every 50, 150, 300 or 450 meters, along the streamer 10 and used to control the depth and lateral position of the streamer 10;
  environmental sensors, not shown in the figures;
  cameras, not shown in the figures;
  etc.

In other words, auxiliary equipment supplements the aforesaid seismic devices such as the seismic sensors, nodes and telemetry modules, to allow a good operation of the seismic acquisition system.

FIG. 2 illustrates in detail the block referenced A in FIG. 1, which is a portion of the streamer 10a. In FIG. 2, each bird 14 includes a body 1 equipped with motorized pivoting wings 2 allowing to modify the position of the streamers laterally between them by a horizontal driving and drive the streamers in immersion by a vertical driving. The nodes 20 are represented by hatched squares in FIGS. 1 and 2.

The nodes 20 are connected to the concentrators 40 via electrical wires, not shown in the figures. More precisely, all the nodes 20 are arranged in series along the electrical wires from the head end to the tail end of the streamer 10. Each node 20 is associated with a given set of seismic sensors 30 and is adapted in particular to collect seismic data issued from this set of seismic sensors 30 and to digitize them, if necessary, before sending them, via the concentrators 40 and the seismic telemetry cable, towards the vessel 11. Control data may be also transmitted from the vessel towards the nodes 20, via the concentrators 40 and the seismic telemetry cable, for proper functioning of the seismic acquisition system.

Concentrators 40 are assembled in series along the streamer 10. Each concentrator 40 is associated with one or several nodes 20 for providing electrical power supply to these nodes 20 and for concentrating the seismic data issued from these nodes 20. Then, the concentrators 40 transmit the concentrated data towards the vessel 11 via the seismic telemetry cable in order to be processed in the central unit located onboard the vessel 11.

A known node assembly includes a single node with a horseshoe-shaped electronic unit casing and a complementary part for forming a generally cylindrical shape. The casing and complementary part are made of a metal, especially aluminum. In the horseshoe-shaped casing, there is a hollow horseshoe-shaped space for housing electronics, especially an electronic board. A disadvantage of such node is that the added weight to the streamer is high. The added weight alters the overall streamer weight, which is of prime importance in the seismic industry. The streamer needs particular buoyancy so that the streamer remains flat at a particular depth. Also, in such node, the electronic unit casing is prevented from water ingress thanks to a potting resin which is filled in the electronic board housing, sealing the node. However, the use of such potting resin makes the node manufacturing process very complex in terms of replicability and generates severe node design constraints, in particular inducing stresses on the electronic components when submitted to temperature change, the differential thermal coefficient of expansion between the different materials being high.

Another known assembly includes a cylindrical casing made of a metal material, especially aluminium, said casing being split into two symmetrical half cylindrical sub casing. Said casing forms a cylinder having a central hollow part for housing a portion of cable of the streamer and a half-cylindrical hollow space placed around the hollow core in each subcasing for housing electronic boards. Said casing houses two node electronics at one single location, which double the risk of node failure due to a particular damage at this specific location. Furthermore, said casing, including two node electronics, limits the added weight to the streamer but has the disadvantage to be longer than the previous embodiment. Indeed, the streamer with the assembly is to be winded up on a reel when stored. The longer the assembly, the greater the bending forces with which the electronic unit has to cope. Limiting the assembly length minimizes the overall forces and decreases consequently the risk of mechanical failure. Such an assembly also requires the addition of supplemental mounting pieces positioned at lateral ends of the assembly for mounting the nodes onto the streamer. These supplemental pieces add supplemental length to the assembly, so that the available length for the electronics is to be reduced for a similar size. The space for electronics is therefore not optimized.

OBJECT OF INVENTION

The invention, in at least one embodiment, is aimed especially at overcoming at least some of these different drawbacks of the prior art.

More specifically, it is a goal of at least one embodiment of the invention to provide an electronic unit or node having a casing quite easy to manufacture.

It is another goal of at least one embodiment of the invention to provide an electronic unit providing more space for housing electronics without increasing the size of the electronic unit.

It is another goal of at least one embodiment of the invention to provide an electronic unit substantially encompassed in the streamer diameter excluding its outer jacket.

It is another goal of at least one embodiment of the invention to provide electronic units limiting the added weight to the streamer.

It is another goal of at least one embodiment of the invention to provide electronic units having an even distribution of the weight relative to the inline axis of the streamer.

SUMMARY OF THE INVENTION

These objectives and others may be achieved thanks to the present invention, which proposes an electronic unit configured for being part of a streamer and for surrounding a core cable of the streamer, said electronic unit including at least:
- a casing, at least partially flexible, at least partially made of a polymer material, said casing extending along a longitudinal axis between two lateral ends and having:
  - a hollow cylindrical core for housing a portion of said core cable of the streamer, and
  - a plurality of walls outwardly extending from said hollow cylindrical core, delimiting spaces configured for housing electronics, and having free ends
  wherein one of the walls and the hollow cylindrical core of the casing have a through-slot, said through-slot extending longitudinally over a total length of the casing between the lateral ends,
- an electronic board including at least one flexible part and configured for at least partially resting on said free ends of at least two of said plurality of walls.

Thanks to the invention, the lightweight of the material of the casing allows to achieve neutral buoyancy of the streamer.

Furthermore, the polymer material is chosen in particular for providing some flexibility to the electronic unit. The winding around a reel therefore does not create as much stresses as in prior art made of metal, the overall stiffness of the assembly being decreased. Also, for a similar area available to implement electronics, the length of the electronic unit will be diminished, limiting the stresses induced when winded up. By "flexible", it is to be understood that the casing is preferably made of a polymer material having an elongation at yield in the range 30% to 60% and/or a tensile strength at yield in the range 20 MPa to 70 MPa. The electronic unit may be aimed at processing data issued from at least one seismic sensor. Alternatively, the electronic unit may be equipped with a compass, or may be configured for controlling a steering device or may be equipped with acoustic transducers.

The through-slot is configured to place the portion of the core cable of the streamer within the hollow cylindrical core of the casing of the electronic unit. Indeed, the slot, extending from the free end of said one of the walls until the hole of the hollow cylindrical core, allows to move edges of the through-slot apart, insert the electronic unit into the streamer by arranging the electronic unit around a portion of the core cable of the streamer, and, then, release the edges of the through-slot so that the electronic unit is firmly maintained around the cable in particular thanks to the elasticity of the polymer material.

The electronic board may not surround said through-slot. This may allow keeping free the passage formed by the through-slot.

The electronic may surround the through slot. In that particular embodiment, said casing is inserted into the streamer first, and the electronic board is then mounted on said casing.

The electronic board may be surrounded by a streamer skin or the streamer outer jacket.

The electronic unit may also include a sleeve, for example a flexible sleeve, made of a polymer material, surrounding both casing and electronic board and configured for providing at least partially watertightness to the electronic unit. The sleeve may be surrounded by a streamer skin or the streamer outer jacket.

The flexibility of the sleeve may be similar to the one of the casing.

Each or part of the walls may extend radially outwardly. Each wall may extend up to a free end. The free ends of the walls may define part of the external shape of the casing. The electronic board surrounds for example said free ends.

In a particular embodiment, the electronic unit may comprise a reinforcement surrounding at least one of said electronic board and said sleeve. This means that the reinforcement for example surrounds said sleeve, if any, and/or said electronic board and casing. The reinforcement may be made of a metal, a composite material, a filled plastic material or any suitable material. The reinforcement may be surrounded by a streamer skin or the streamer outer jacket.

In another particular embodiment, there is no reinforcement. In such case, the sleeve or electronic board may then be surrounded by a streamer skin or the streamer outer jacket.

In a particular embodiment, there is no sleeve surrounding the electronic board but an outer jacket of the streamer. Such an outer jacket may be extruded around the electronic board and casing, providing watertightness to the electronic unit.

The electronic board may include a plurality of flexible parts and a plurality of rigid parts, the flexible parts linking two adjacent rigid parts together. The number of rigid parts may be in the range five to eight, preferably equal to five or six. The electronic board may be obtained using a technology such as Z-milling or flexible polyimide layer. The electrical components may be implemented facing the hollow cylindrical core so as to be protected by the walls outwardly extending from the hollow cylindrical core, and by the electronic board. This great flexibility of the electronic board may allow it to conform to a variety of shapes, in particular a generally cylindrical shape of the casing.

In case the free ends of the walls are covered by the electronic boards, the flexible parts of the electronic board advantageously surround part of the free ends of the walls of the casing, the flexible parts being not submitted to any mechanical constraints. The rigid parts may surround the spaces between the walls and rest on part of the free ends of the walls.

The polymer material of the casing is for example chosen from the group consisting of: polyurethane, polyester, polyvinyl chloride, an elastomer material and, more generally, a polymer material sufficiently flexible. By "sufficiently flexible", it is to be understood that the polymer material may have an elongation at yield in the range 30% to 60%, preferably 35% to 55%. The polymer may also have a tensile strength at yield in the range 20 MPa to 70 MPa, preferably 25 MPa to 50 MPa.

The external surface of the core cable of the streamer may be made in polyurethane, polyester, polyvinyl chloride, an elastomer material or, more generally, any polymer material sufficiently flexible.

If the casing and the external surface of the core cable of the streamer are made out of polyurethane, their assembly one onto the other benefits of a high coefficient of friction which allows maintaining the electronic unit in position on the portion of core cable, without supplemental fastening means.

In case a sleeve is assembled, the polymer material of the sleeve may be chosen from the group consisting of: polyurethane, polyester, polyvinyl chloride, an elastomer material and, more generally, any polymer material sufficiently flexible, such as the one of the casing, for example.

The diameter of the electronic unit may substantially be smaller or equal to the diameter of the streamer, not considering its outer jacket. The outer jacket of the streamer may surround the electronic unit, at least the casing and electronic board, so that the outer jacket is made of one continuous part and not requiring any additional overmolding step. This may for example improve the watertightness of the electronic unit. The outer jacket would be extruded in one single pass making it continuous and not requiring any additional overmolding step.

The invention also provides, in combination with the above, a method for making an electronic unit as described above, including the following steps:
    making the casing by moulding, in particular injection moulding,
    arranging the electronic board onto the casing,
    mounting the electronic unit on the streamer.
The method may also comprise the following steps, in case the electronic unit comprises a sleeve:
    inserting the casing and electronic board into the sleeve,
    welding part of the sleeve to the casing so as to provide watertightness to the electronic unit,
    slicing the sleeve so as to make a through-slot aligned with the one of the casing.

The step of slicing the sleeve may alternatively be implemented before inserting the casing and electronic board into the sleeve. In such case, the positioning of the sleeve relative to the casing is made so that both through-slots are aligned with one another.

The step of welding the sleeve to the casing may comprise welding all peripheral ends of the sleeves with all corresponding faces of the cases onto which the peripheral ends of the sleeves rest.

The invention also provides, in combination with the above, a method for installing the electronic unit in a streamer, including the following steps:
    moving apart edges of the through-slot,
    inserting a portion of cable of the streamer in the hollow cylindrical core so as to install the electronic unit within the streamer,
    releasing the edges of the through-slot.

Thanks to the flexibility of the electronic unit, the method of installation is quite easy to implement. Thanks to the elasticity of the electronic unit due to the material and to the configuration, the electronic unit is maintained in position on the streamer cable.

The method may also include the step consisting of making a reinforcement around the sleeve. This step may reinforce the robustness of the electronic unit.

The method may also include the step consisting of overmoulding an outer jacket of the streamer on the electronic unit.

The invention also provides, in combination with the above, a streamer including at least one electronic unit according to the above.

BRIEF DESCRIPTION OF THE DRAWINGS

Other features and advantages of embodiments of the invention shall appear from the following description, given by way of an indicative and non-exhaustive examples and from the appended drawings, of which.

DETAILED DESCRIPTION

In the following description, the term "cable" could be used indifferently with "core cable", and represent the central subset of transmission wires embedded in the streamer.

Figure 1:
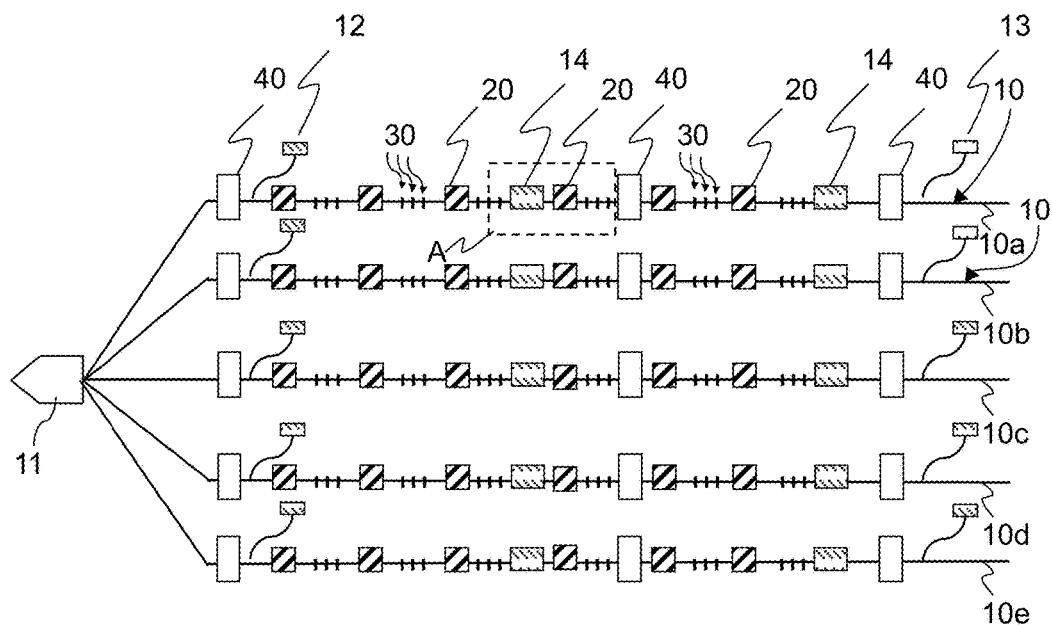
FIG. 1, already described with reference to the prior art, presents an example of network of seismic streamers towed by a seismic vessel.
Figure 2:
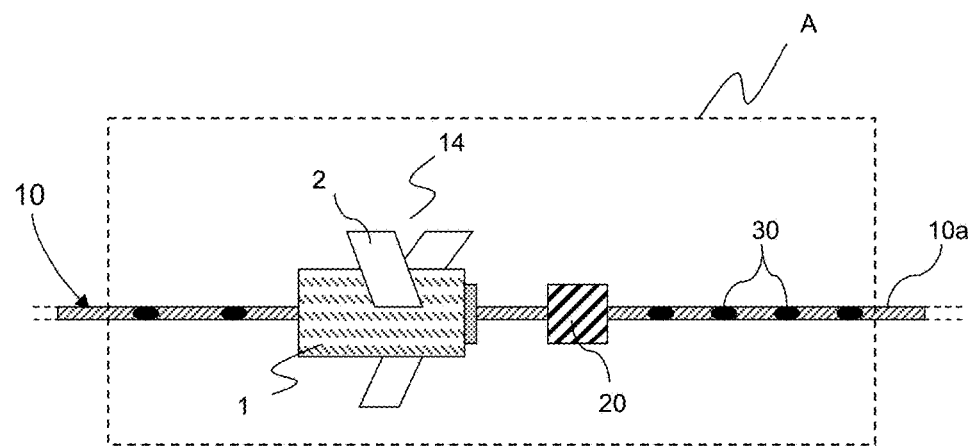
FIG. 2, already described with reference to the prior art, illustrates in detail the classic structure of a portion of seismic streamer of FIG. 1.
Figure 3:
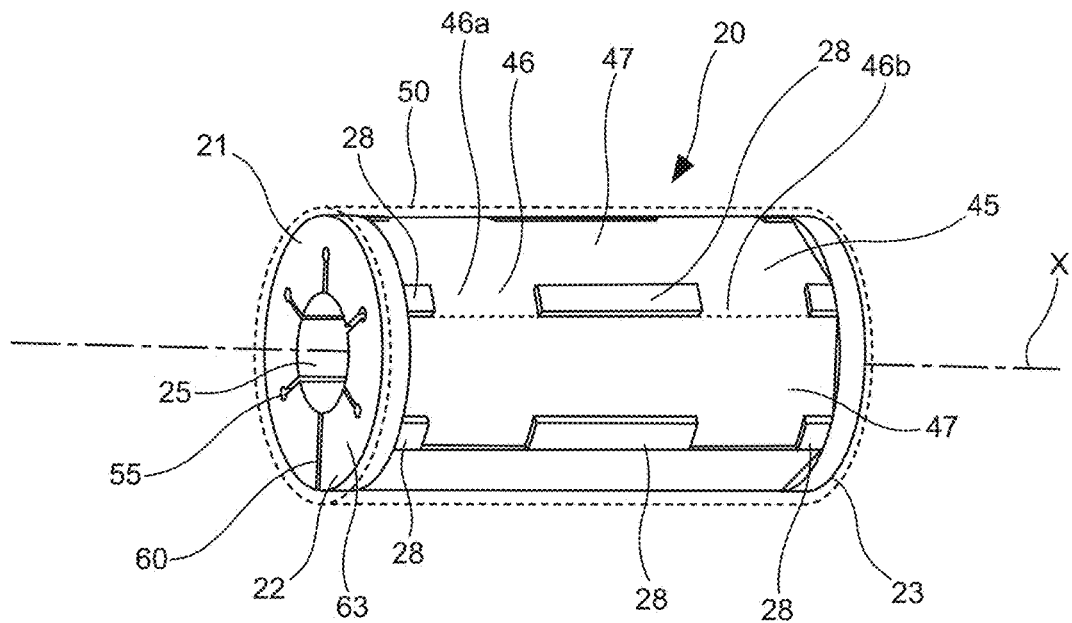
FIG. 3 is a schematic view, in perspective, of an embodiment of an electronic unit according to the invention.
Figure 4:
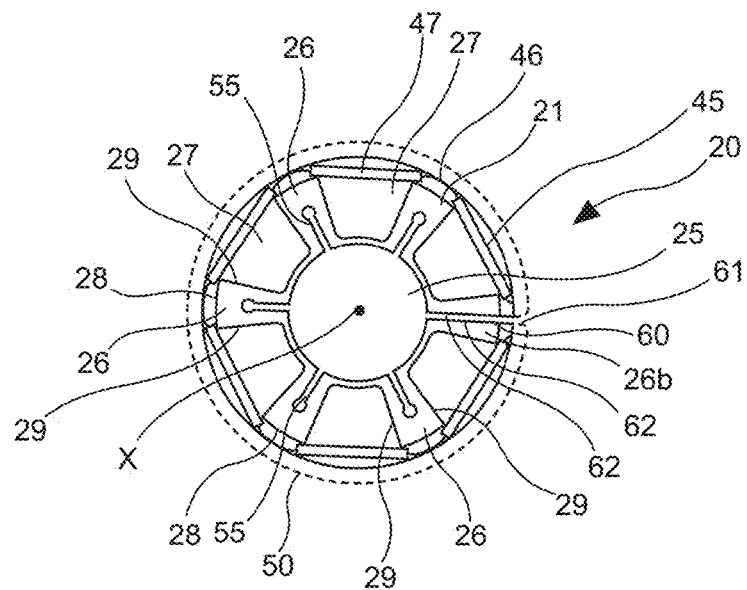
FIG. 4 is a schematic cross-section view of the electronic unit of FIG. 3.

FIGS. 3 and 4 show an embodiment of an electronic unit 20 or node according to the invention, shown in isolation. In this particular embodiment, the electronic unit 20 is at least partially dedicated to processing data issued from at least one seismic sensor but the electronic unit could be dedicated to another function without departing from the scope of the invention. The electronic unit 20 is configured for being part of the streamer 10 and for surrounding a core cable 5 of the streamer 10.

The electronic unit 20 includes a casing 21 at least partially flexible, at least partially made of a polymer material. The casing 21 extends along a longitudinal axis X between two lateral ends 22 and 23. The casing 21 has a hollow cylindrical core 25 for housing a portion of cable 5 of the streamer 10. The casing 21 has a plurality of walls 26 outwardly, in this embodiment radially outwardly, extending from the hollow cylindrical core 25. The walls 26 delimit between them spaces 27 configured for housing electronics. In the embodiment of FIGS. 3 and 4, there are six walls, but the number of walls may vary without departing from the scope of the invention. Still in this particular embodiment, the wails 26 are regularly placed around the hollow cylindrical core 25. Each wall 26 has two external surfaces 29 delimiting the wall 26 and, in this particular example, extending radially outwardly.

The electronic unit 20 also includes an electronic board 45 including at least one flexible part 46. The electronic board 45 is configured for at least partially resting on at least two free ends 28 of the plurality of walls 26.

In this particular embodiment, the electronic unit 20 also includes a sleeve 50, shown in FIG. 3 as a dotted line, made of a polymer material, surrounding both casing 21 and electronic board 45 and configured for providing watertightness to the electronic unit 20. The sleeve 50 also extends along the longitudinal axis X and has a global cylindrical shape.

As shown in FIG. 4, each wall 26 extends from the hollow cylindrical core 25 up to a free end 28. The free ends 28 of the walls 26 substantially define part of the external shape of the casing 21 in this embodiment. The electronic board 45 rests on at least part of the free ends 28, the electronics facing the hollow cylindrical core 25 and thus being protected inside the casing.

The electronic board 45 includes a plurality of flexible parts 46 and a plurality of rigid parts 47, the flexible parts 46 linking two adjacent rigid parts 47 together, the number of rigid parts 47 being, in this embodiment, equal to six.

The rigid parts 47 of the electronic board rest on some of part of the free ends 28 of the walls 26 of the casing 21 in this embodiment, the flexible parts 46 being not submitted to any constraint and surrounding part of the free ends 28 of the walls 26.

The electronic board 45 may be issued from technologies such as Z-milling or flexible polyimide layer, well known from one skilled in the art.

It should to be noted that this particular configuration may be different without departing from the scope of the invention, for example the flexible parts of the electronic board may have another place within the electronic board, their number may vary, for example in the range 1 to 10 or more.

One of the walls 26, referenced 26a, and the hollow cylindrical core 25 of the casing 21 have a through-slot 60. The through-slot 60 extends longitudinally over a total length of the casing 21 from one lateral end 22 to another lateral end 23, and extends within the wall from the hollow of the hollow cylindrical core 25 to the free end 28 of the wall 26a. A corresponding through-slot 61, aligned with the through-slot 60 of the casing 21 is provided in the sleeve 50, as shown in FIG. 4. The electronic board 45 does not surround the through-slot 60 so as to keep a free passage. The through-slot 60 is radially oriented and separates the wall 26a into two symmetrical half-walls, in this embodiment. The through-slot 60 and corresponding through-slot 61 are defined by edges 62 respectively corresponding to internal surfaces of the wall 26a delimiting the through-slot 60 and by edges of the sleeve 50 delimiting the through-slot 61, as shown in FIG. 4.

In this embodiment, the polymer material of the casing 21 is polyurethane and the polymer material of the sleeve 50 is polyurethane. The choice of polyurethane provides several advantages among which the elasticity of the electronic unit 20, the lightweight of the electronic unit, the watertightness of the material and welding, the high coefficient of friction of the electronic unit on the cable of the streamer also made of polyurethane, and the tear strength of the cable or outer jacket of the streamer.

In this embodiment, the walls 26, other than the wall 26a provided with the through-slot 60, are provided with a groove 55 that may provide elasticity to the wall 26 when moving apart the edges 62 of the through-slot 60 and 61 when installing the electronic unit 20 on the streamer cable.

The casing, thanks to its lateral ends 22, 23, its hollow cylindrical core 25, and with the welded sleeve 50, seal the spaces 27 housing the electronics and prevent any water ingress.

The electronic unit 20 may be made with the method comprising the following steps:
making the casing 21 by injection moulding,
arranging the electronic board 45 onto the casing 21.

In this embodiment, the method also includes the following steps:
inserting the casing 21 and electronic board 45 into the sleeve 50,
welding part of the sleeve 50 to the casing 21 so as to provide watertightness to the electronic unit 20.
slicing the sleeve so as to make a through-slot aligned with the one of the casing.

The step of welding the sleeve 50 to the casing 21 includes welding all peripheral ends of the sleeve 50 with each faces of the casing 21 on which the peripheral ends rest. The method for installing the electronic unit 20 includes the following steps, in this embodiment:
moving apart edges 62 of the through-slot 60, 61,
inserting a portion of a core cable of the streamer 10 in the hollow cylindrical core 25 so as to install the electronic unit 20 within the streamer 10,
releasing the edges 62 of the through-slot 60, 61.

Figure 5:
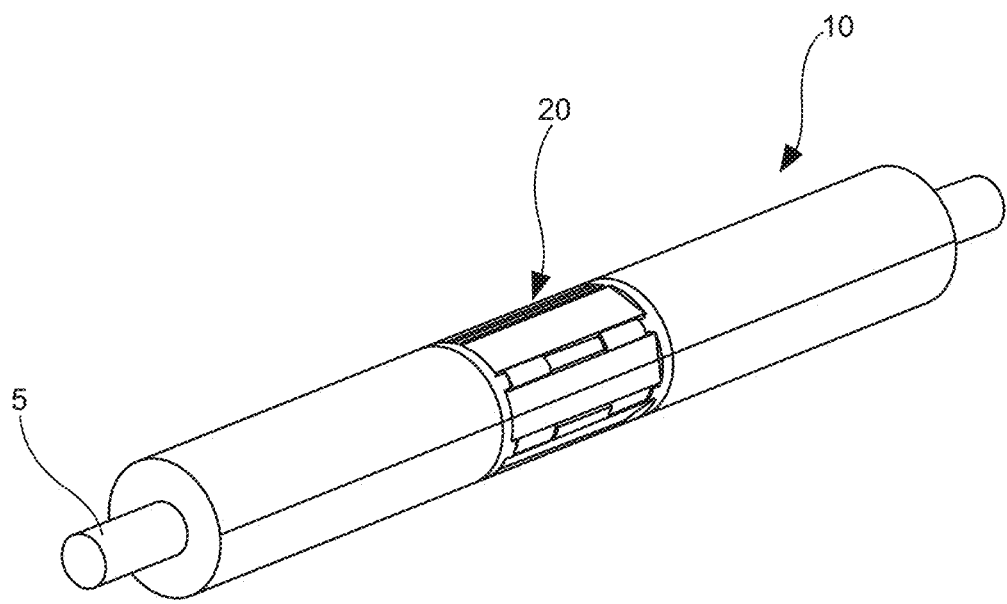
FIG. 5 illustrates schematically an example of a portion of streamer with an electronic unit integrated within the streamer, the streamer outer jacket being not represented.

As shown in FIG. 5, the electronic unit 20 may be fully integrated in the streamer 10, having a diameter not greater than the one of the rest of the streamer, without the outer jacket of the streamer, at least laterally around the electronic unit 20. As such, once the electronic unit 20 is mounted on the streamer, an outer jacket or skin of the streamer may be extruded, thereby providing a cable of streamer being homogeneous, watertight, and without discontinuity.

Figure 9:
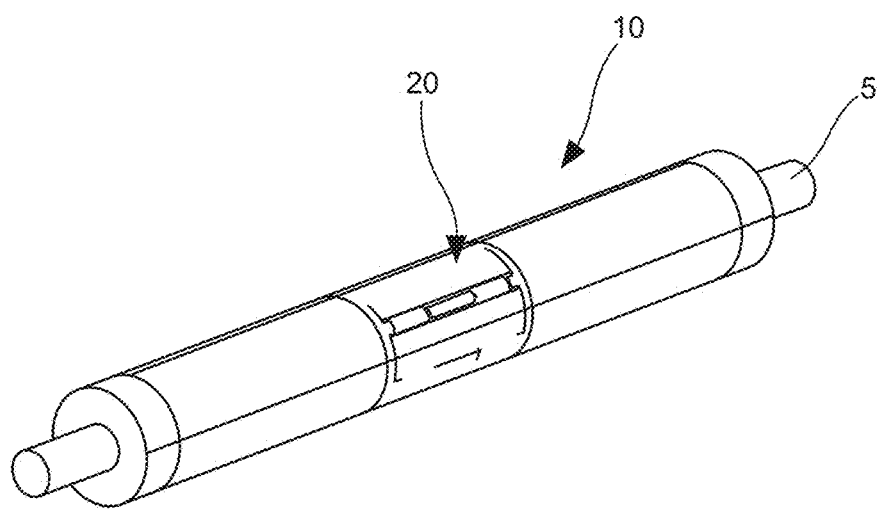
FIG. 9 illustrates schematically another example of a portion of streamer with an electronic unit integrated within the streamer

FIG. 9 presents the electronics assembly surrounded by the streamer jacket 6.

Figure 6:
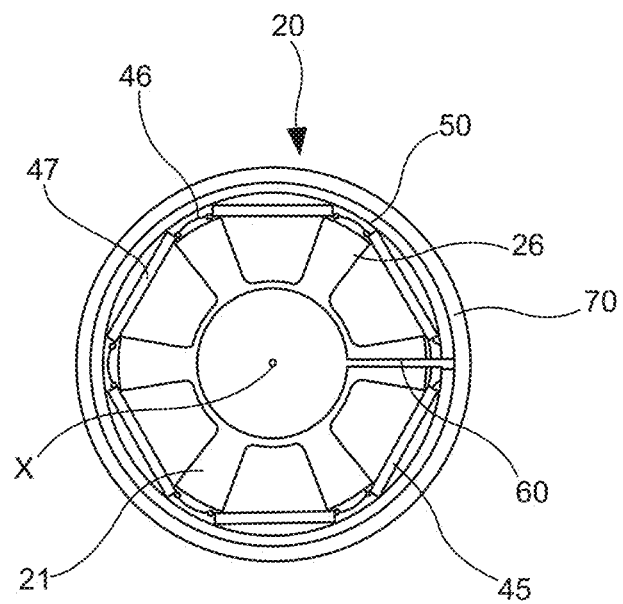
FIG. 6 shows a schematic cross-section view of another embodiment of an electronic unit according to the invention.
Figure 7:
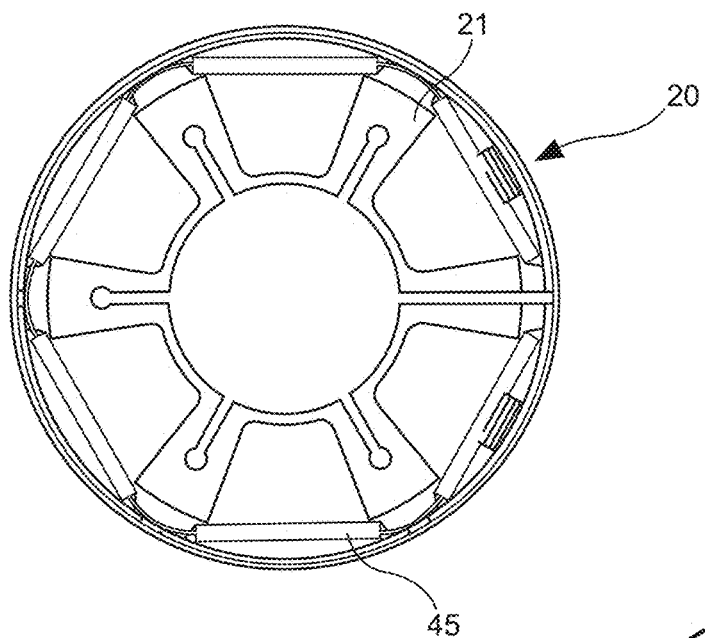
FIG. 7 is a schematic cross-section view of another embodiment of an electronic unit according to the invention.
Figure 8:
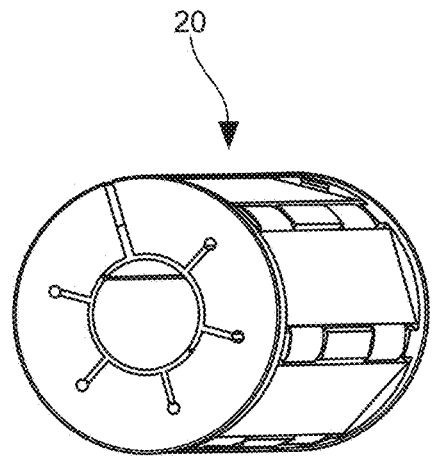
FIG. 8 shows the embodiment of FIG. 7, in a schematic view in perspective.

In another embodiment, shown in FIGS. 6 and 7, the electronic unit 20 includes a reinforcement 70 surrounding the sleeve 50 in FIG. 6, or positioned underneath the sleeve 50 in FIG. 7. In case the reinforcement 70 surrounds the sleeve 50, the method includes the step consisting of positioning the reinforcement 70 around the sleeve 50. The reinforcement may have the shape of a portion of a tube, or other shape without departing from the scope of the invention. The reinforcement is made in a metal material in this particular embodiment. The reinforcement 70 may be made once the rest of the electronic unit is installed on the streamer 10. In such case, as shown in FIG. 6, the reinforcement surrounds the through-slot 61.

In case the reinforcement 70 is positioned underneath the sleeve 50, the method includes the step of positioning the reinforcement 70 on the free ends 28 of the casing after having installed the electronic board 45, and inserting the resulting assembly in the sleeve 50 in order to weld the sleeve 50 with the casing 21. In such case, the reinforcement is designed in multiple pieces in order to allow move the edges 62 apart to insert the electronic unit onto the core cable.

In the embodiment of FIG. 6, there are no grooves 55 made in the walls 26. The elasticity of the material of the casing 21 may be sufficient for the installation of the electronic unit on the cable, even if a supplemental strength may then be applied to move apart the edges 62 of the through-slot 60, 61. Such embodiment without any groove 55 may allow distributing the tensile stresses more regularly all around the hollow cylindrical core 25 and walls 26 than with grooves 55, when moving apart the edges 62. Still in this embodiment of FIG. 6, the flexible parts 46 are linked to the rigid parts 47 in an inside part of the rigid parts 47, as shown. This absence of groove, although disclosed in combination with the embodiment of FIG. 6, may be used also for other embodiments of the invention.

Other embodiments may be provided without departing from the scope of the invention.

In another embodiment, not shown, the electronic unit has no sleeve but reinforcement.

In another embodiment, not shown, there is neither sleeve nor reinforcement, but an overmolded outer jacket of the streamer, which provides watertightness.

The reinforcement may be made in a composite material or in a filled plastic material.

In the specification and claims, the expression "includes a" has to be understood as meaning "includes at least one", unless expressly written.

The invention claimed is:

1. An electronic unit configured for being part of a streamer and for surrounding a core cable of the streamer, said electronic unit comprising:
    a casing, at least partially flexible, at least partially made of a polymer material, said casing extending along a longitudinal axis (X) between two lateral ends, said casing comprising:
        a hollow cylindrical core along said longitudinal axis (X), for housing a portion of said core cable of the streamer, and
        a plurality of walls outwardly extending from said hollow cylindrical core, delimiting spaces configured for housing electronics, and having free ends, wherein one of the walls and the hollow cylindrical core of the casing have a through-slot, said through-slot extending longitudinally over a total length of the casing between the lateral ends,
    an electronic board including at least one flexible part and configured for at least partially resting on free ends of at least two of said plurality of walls.
2. The electronic unit according to claim 1, further comprising a sleeve made out of a polymer material, surrounding both casing and electronic board and configured for providing at least partially watertightness to the electronic unit.

3. The electronic unit according to claim 1, wherein each wall extends up to a free end, wherein the free ends of the walls define part of an external shape of the casing and wherein the electronic board surrounds said free ends.

4. The electronic unit according to claim 1, further comprising a reinforcement surrounding at least said electronic board.

5. The electronic unit according to claim 2, further comprising a reinforcement surrounding at least one of said electronic board and said sleeve.

6. The electronic unit according to claim 1, wherein the electronic board includes a plurality of flexible parts and a plurality of rigid parts, the flexible parts linking two adjacent rigid parts together, the electronic board being obtained using a technology such as Z-milling or flexible polyimide layer.

7. The electronic unit according to claim 6, wherein the flexible parts of the electronic board surround part of the free ends of the walls of the casing, the rigid parts surrounding the spaces between the walls and resting on part of the free ends of the walls.

8. The electronic unit according to claim 1, wherein the polymer material of the casing is chosen from the group consisting of: polyurethane, polyester, polyvinyl chloride, and an elastomer material.

9. The electronic unit according to claim 1, wherein the polymer material of the casing is chosen so as to have an elongation at yield in the range 30% to 60% and a tensile strength at yield in the range 20 to 70 MPa.

10. A streamer comprising:
    a cable to be towed by a ship,
    at least one seismic sensor located on the cable and
    at least one electronic unit according to claim 1.

11. A method for making an electronic unit of a structure as defined in claim 1, said method comprising the steps of:
    making the casing of said electronic unit by moulding,
    arranging the electronic board onto the casing.

12. A method according to claim 11, further comprising:
    inserting the casing and electronic board into a sleeve made out of a polymer material, and
    welding part of the sleeve to the casing so as to provide watertightness to the electronic unit.

13. A method according to claim 12, further comprising the step of slicing sleeve so as to form the through-slot.

14. A method for installing an electronic unit according to claim 1 in a streamer, said method comprising the steps of:
    moving apart edges of the through-slot of said electronic unit,
    inserting a portion of cable of the streamer in the hollow cylindrical core so as to install the electronic unit within the streamer, and
    releasing the edges of the through-slot.

15. A method according to claim 11, further comprising the step of making a reinforcement around a sleeve (50) made out of a polymer material that surrounds both the casing (21) and the electronic board (45).

16. A method according to claim 11, further comprising the step of overmoulding an outer jacket of the streamer on the electronic unit.

* * * * *